Aug. 7, 1956  D. A. HOLLEY  2,757,650
THERMOSTATIC CONTROL FOR MARINE ENGINE COOLING SYSTEMS
Filed Nov. 12, 1953

STARTING

RUNNING NORMALLY HOT

INVENTOR
Donald A. Holley

BY Shoemaker + Mattare

ATTORNEYS

United States Patent Office 2,757,650
Patented Aug. 7, 1956

2,757,650

THERMOSTATIC CONTROL FOR MARINE ENGINE COOLING SYSTEMS

Donald A. Holley, Waverly, Iowa

Application November 12, 1953, Serial No. 391,435

6 Claims. (Cl. 123—41.08)

The present invention relates to improvements in thermostatic controls for marine engine cooling systems and more particularly to an improved thermostatic valve unit and arrangement of sections between the valve unit and marine engine.

The present invention constitutes an improvement over the arrangement disclosed in my prior Patent No. 2,536,642 issued January 2, 1951. In my prior arrangement, cool water was drawn from the body of water in which the boat was floating and the water was passed from the water pump through the oil cooler and then divided up with part being delivered to the water jacket of the engine and part passing through a rather long conduit to the thermostatic valve unit. In starting condition, the thermostatic valve of my prior arrangement was closed and cooling liquid passed from the oil cooler through the valve unit and out through the exhaust manifold, the water in the engine water jacket becoming warmed by operation of the engine. After the engine was warmed up, the temperature of the water in the water jacket would effect partial opening of the thermostatic valve thereby bringing about a partial passage of cooling water through the water jacket, thermostatic valve and exhaust manifold and part directly from the oil cooler through the thermostatic valve and out through the exhaust manifold. Of course, when the engine became overheated, the thermostatic valve completely opened, shutting off flow through the water jacket bypass conduit and opening wide passage through the thermostatic valve so that all of the cooling water passed from the oil cooler to the engine water jacket and thermostatic valve and out through the exhaust manifold.

In order to bring about more effective operation of the cooling system disclosed in my prior patent, I have found that the arrangement must be such that the thermostatic unit must promptly respond to temperature rise of the water within the water jacket of the engine. Furthermore, I have found that the number of conduits provided for interconnecting the thermostatic valve unit with the marine engine should be minimized and also that the connection between the thermostatic unit and marine engine should be more direct so that the actual temperature condition within the water jacket will be accurately reflected in the thermostatic valve unit.

Accordingly, it is a primary object of the present invention to provide a thermostatic control for marine engine cooling systems which will fulfill the requirement above stated.

A further object of the present invention is to provide improved thermostatic control for marine engine cooling systems wherein the thermostatic control unit is so formed that cooling liquid from the marine engine is continually passing therethrough so that the unit will at all times have liquid surrounding the same which is at substantially the same temperature as the liquid in the cooling jacket of the engine.

Still another object of the present invention is to provide an improved thermostatic control for marine engine cooling systems wherein the flow of cooling liquid in the starting stage substantially completely passes from the water pump and oil cooler through the exhaust manifold, thermostatic valve and back through the exhaust manifold to exhaust with only a small quantity of liquid passing through the marine engine water jacket and out through the thermostatic valve and exhaust manifold so that the marine engine may rapidly warm up and yet so that the thermostatic valve will promptly respond when the desired operating temperature is achieved in the engine.

Another object of the present invention is to provide an arrangement wherein the thermostatic control valve can be directly secured to the exhaust manifold.

Various other objects and advantages will become apparent from the detailed description to follow.

The best form in which I have contemplated applying my invention is clearly illustrated in the accompanying drawings wherein.

Figure 1:
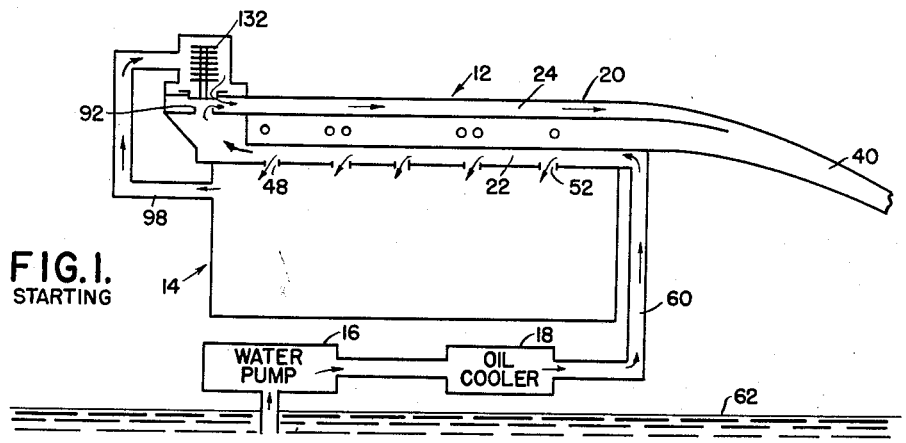
Fig. 1 is a diagrammatic view showing my improved system when in a starting position.

Referring more particularly to the drawings wherein like numerals designate like parts throughout, it will be seen that my invention is comprised of a thermostatic control unit 10 mounted on one end of the exhaust manifold casing 12 of the marine engine 14. As is conventional, the marine engine is provided with a water pump 16 and an oil cooler 18, both being shown diagrammatically in Figs. 1 and 2.

Figure 2:
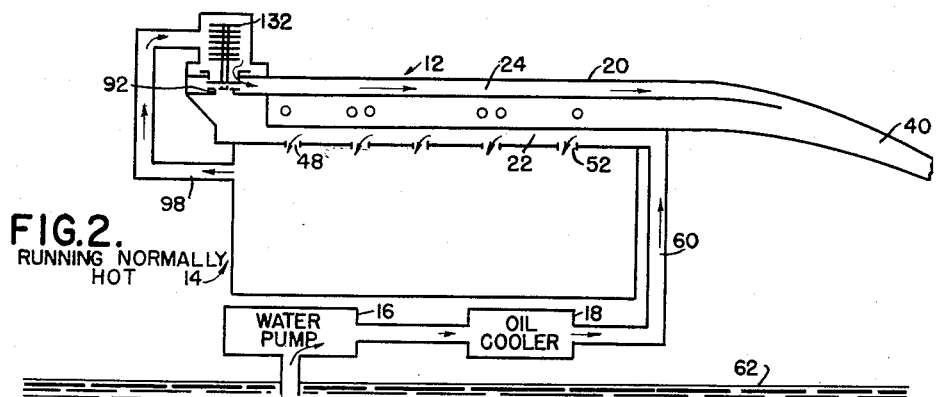
Fig. 2 is a diagrammatic view similar to Fig. 1 but wherein the engine is in a normal heated or normal hot condition.
Figure 3:
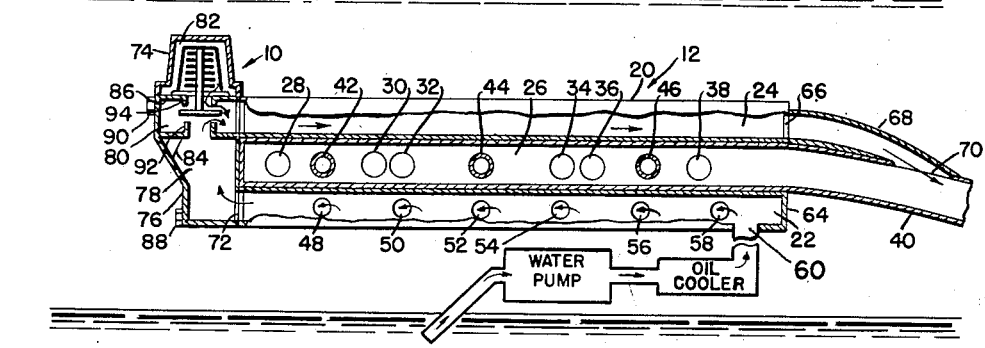
Fig. 3 is a view showing my improved thermostatic control valve unit showing the manner in which the same is secured to one end of the exhaust manifold of a marine engine.

As best shown in Fig. 3, the exhaust manifold 12 is comprised of a casing 20 having a lower first passage 22 and an upper second passage 24 separated by the partition 26. The partition 26 has ports 28, 30, 32, 34, 36 and 38 communicating with the exhaust from the engine and also the exhaust pipe at 40. The numerals 42, 44 and 46 designate, in Fig. 3, fuel intake pipes, which are shown in cross section and which pass transversely across the exhaust receiving space into which the exhaust ports 28—38 open. These pipes 42, 44 and 46, of course, are connected in a suitable manner with the engine carburetor, not shown. In Figs. 1 and 2 which are diagrammatic, the fuel intake pipes 42, 44 and 46 are not shown, to avoid confusion. The ports 48—58 provide for communication between the first passage 22 and the cooling jackets of the marine engine. At one end of the exhaust manifold casing 20, a pipe 60 is connected, the pipe being shown diagrammatically and as connected with the oil cooler 18 and water pump 16 for receiving water from the body shown at 62. The manifold casing 20 has one end thereof closed off at 64 except for communication between the exhaust pipe and the exhaust port and also with the exception of the opening at 66 whereby the conduit portion 68 can communicate the second passage 24 with the exhaust pipe 40 and 70 so as to mix the cooling liquid with the exhaust gases for discharge back into the body of water 62. The opposing end of the exhaust manifold casing 20 although ordinarily closed off is in the present instance machined off at 72 so as to provide a base upon which the thermostatic control valve unit can be mounted. It will thus be seen that the first and second passages 22 and 24 open out onto the face at 72.

The thermostatic control valve unit 10 is comprised of a two-part housing 74, 76 divided into three chambers 78, 80 and 82, constituting first, second and third chambers, partitions being provided at 84 and 86 for this purpose. The first chamber 78 is in communication with the first passage 22 of the exhaust manifold while the second chamber 80 is in communication with the second passage 24 of the exhaust manifold. Bolts as at 88 and 90 are utilized for securement of the valve housing to the exhaust manifold casing so that sealed communication is provided between the chambers and the passages. The partition 84 is provided with an upstanding collar at 92 which provides a valve seat for a purpose to be described in detail hereinafter. The partition 86 is also formed with a collar as at 94 which also serves as a valve seat. Valve chamber 82 has an inlet connection at 96 to which a conduit 98 is attached, the opposite end of conduit 98 being connected with the water jacket of the marine engine as shown diagrammatically in Figs. 1 and 2.

Figure 4:
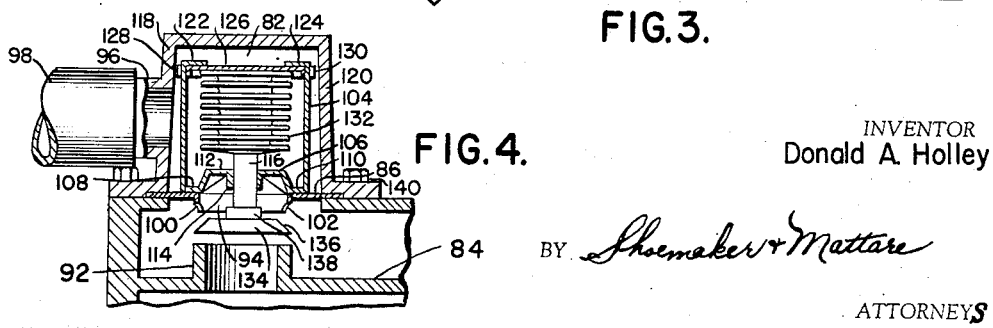
Fig. 4 is an enlarged detailed sectional view of the thermostatic control valve of the present invention.

Referring now to Fig. 4, the details of the valve unit will be described. The valve unit is comprised of a valve seat member which constitutes the partition 86, and collar 94 above described. The annular collar 94 which constitutes the valve seat is formed with notches or cutaway portions at 100 and 102 for a purpose to be more fully described hereinafter. Secured to the valve seat partition member 86 is a support 104 which is formed from an elongated substantially flat strap of metal angulated so as to be substantially of U-shape. The bight portion 106 of the strap 104 has end portions at 108 and 110 secured to the seat member 86 while the intermediate portion 112 is angulated away from the valve opening and is formed with a central annulus at 114 providing a guide for the valve stem 116. The free ends of the legs 118 and 120 are inwardly angulated at 122 and 124 for securement to the end plate 126, ears being provided at 128 and 130 for aiding in the securement of the plate 126 to the legs 118 and 120. The plate 126 has a substantially conventional bellows 132 secured thereto, the opposing ends of the bellows being secured to the valve stem 116. The free end of the valve stem 116 below the valve seat 94 is provided with a poppet type valve head 134 which has a beveled seating face at 136 for engagement on the valve seat 94. The valve head 134 is formed with a boss at 138 for receiving the free end of the valve stem 116, solder or other suitable means being employed for securement of the valve head 134 to the valve stem 116. Of course, the valve housing portion 74 may be secured to the other housing portion 76 by bolts at 140, the partition member 86 being seated between the housing portions 74 and 76.

In starting the marine engine, water will be pumped by the pump 16 through the pipe 60 to the oil cooler 18 and from there will pass through the conduit 60 to the first passage 22 of the exhaust manifold casing. The liquid will pass through the open valve means at 92 in the thermostatic unit 10 and out through the second passage 24 for mixture with exhaust gases in the exhaust pipe at 40. Of course, some of the cooling liquid will pass from the first passage 22 through the ports 48—52 into the cooling jacket of the marine engine so as to fill the same. Because of the provision of the openings or notches at 100 and 102 in the valve seat 94 of the valve unit 10, a small amount of cooling liquid will pass from the cooling jacket of the marine engine through the conduit 98 to housing portion 74 and around the bellows 132, through the openings 100 and 102 and out the second passage 24 for exhausting. In this manner, the bellows will at all times be subjected to liquid at a temperature substantially the same as that in the cooling jacket of the marine engine. After the temperature of the cooling liquid in the water jacket has reached a normal operating condition, the bellows will respond thereto and partially open the valve so as to permit the passage of an increased amount of cooling liquid through the pipe 98 and out through the second passage 24, the valve 134 also acting to partially close the valve seat collar at 92 so as to limit the flow from the conduit 60 through the passage 22 and out the second passage 24. In this fashion, cooling of the marine engine will be maintained close to optimum conditions at all times. In the event that the liquid in the cooling jacket of the engine should abruptly rise in temperature the bellows 132 will immediately expand so that the valve at 34 will contact the seat 92 closing of direct communication between the first and second passages 22 and 24 respectively, thereby forcing all of the cooling liquid to pass from the conduit 60 through the ports 48—52, through the cooling jacket and out through the conduit 98, valve unit 10 and second passage to exhaust. This relationship is shown in dotted lines in Fig. 2.

In the drawing there has been illustrated a heat responsive, or thermostatic control, device in the form of a conventional bellows and such has been specifically described in the specification. However, it is not intended that the invention be restricted to a heat responsive element of this specific character since it is possible to employ elements of other types to accomplish the actuation of the valve.

For installation on certain small model engines the outlet passage 24 may have supplemented for it a pipe, hose or tubing for overboard discharge of the cooling water.

From the foregoing it will be seen that the provision of the notches at 100 and 102 permits continuous flow of cooling liquid from the marine engine cooling jacket past the bellows giving more accurate response to temperature changes in the cooling jacket and also preventing stagnation of the liquid in the cooling jacket of the engine. Furthermore, the manner in which the thermostatic unit is attached to the exhaust manifold eliminates the necessity of a long bypass conduit as in my prior arrangements.

As this invention may be embodied in several forms without departing from the spirit or essential characteristics thereof, the present embodiment is therefore illustrative and not restrictive, since the scope of the invention as defined by the appended claims rather than by the description preceding them, and all changes that fall within the metes and bounds of the claims or that form their functional as well as conjointly cooperative equivalents, are therefore intended to be embraced by those claims.

What is claimed is:

1. A thermostatic control for marine engine cooling systems wherein the engine has a cylinder block water jacket and a manifold casing, said manifold casing including fuel intake and exhaust passages and a passageway longitudinally of the manifold for conducting cooling water longitudinally of the manifold and exteriorly of the exhaust passage, partition means dividing said passageway into first and second passageways, said first passageway being connected with the water pump and oil cooler of the marine engine for receiving cool water, passages communicating said first passageway with said cylinder block water jacket, and said second passageway communicating with the exhaust passage adjacent its discharge end for exhaust of the water with the exhaust gases, and thermostatic valve means normally communicating said first passageway with said second passageway for circulating water from the pump through the manifold casing and out with the exhaust gases, an additional passageway interconnecting said valve means with the cylinder block water jacket, said valve means being operable upon rise in temperature of the water in the water jacket to operating temperature to at least partially close communication between said first and second passageways and effect opening movement of the valve to increase flow from the water jaacket through the valve means and out through the second passageway.

2. A thermostatic control for marine engine cooling systems wherein the engine has a cylinder block water jacket and a manifold casing, said manifold casing including fuel intake and exhaust passages and a passageway longitudinally of the manifold for conducting cooling water longitudinally of the manifold and exteriorly of the exhaust passage, partition means dividing said passageway into first and second passageways, said first passageway being connected with the water pump and oil cooler of the marine engine for receiving cool water, passageways communicating said first passageway with said cylinder block water jacket, and said second passageway communicating with the exhaust passage adjacent its discharge end for exhaust of the water with the exhaust gases, and thermostatic valve means normally communicating said first passageway with said second passageway for circulating water from the pump through the manifold casing and out with the exhaust gases, an additional passageway interconnecting said valve means with the cylinder block water jacket, said valve means normally communicating said additional passageway with said second passageway for limited flow of water from the water jacket to the second passageway.

3. A thermostatic control for marine engine cooling systems wherein the engine has a cylinder block water jacket and a manifold casing, said manifold casing including fuel intake and exhaust passages and a passageway longitudinally of the manifold for conducting cooling water longitudinally of the manifold and exteriorly of the exhaust passage, partition means dividing said passageway into first and second passageways, said first passageway being connected with the water pump and oil cooler of the marine engine for receiving cool water, passageways communicating said first passageway with said cylinder block water jacket, and said second passageway communicating with the exhaust passage adjacent its discharge end for exhaust of the water with the exhaust gases, and thermostatic valve means normally communicating said first passageway with said second passageway for circulating water from the pump through the manifold casing and out with the exhaust gases, an additional passageway interconnecting said valve means with the cylinder block water jacket, said valve means normally communicating said additional passageway with said second passageway for limited flow of water from the water jacket to the second passageway, said valve means including thermal responsive means connected with the valve and responsive to rise in temperature of the water passing from the water jacket to at least partially close communication between said first and second passageways and effect opening movement of the valve to increase flow from the water jacket through the valve means and out through the second passageway.

4. The combination with a marine engine cooling system of the type described embodying a water jacket and an exhaust manifold casing having coolant passageways, of a thermostatic valve unit comprising a housing having first, second and third openings in first, second and third chambers, said first and second openings being in communication with the coolant passageways through the said exhaust manifold casing, a valve seat between said first and second openings separating said first and second chambers, said third opening being adapted to be communicated with the water jacket of the engine, a valve seat member between said second and third openings separating said second and third chambers, a bellows in said third chamber carried by said seat member, a valve stem connected with the bellows and reciprocable in response to temperature changes in the liquid surrounding the bellows, a valve head secured to said stem and normally engaging said valve seat member between the second and third chambers so that flow normally is from the first opening to the second opening, said valve seat member between the second and third chambers having bypass openings so that normally restricted flow from the third opening past the bellows to the second opening is permitted.

5. A thermostatic control for marine engine cooling systems wherein the engine has a cylinder block water jacket and manifold casing, said manifold casing including a fuel intake and exhaust passage and a passageway longitudinally of the manifold for conducting cooling water longitudinally of the manifold and exteriorly of the exhaust passage, said passageway being connected with the water pump and oil cooler of the marine engine for receiving cool water, passageways communicating the first passageway with said cylinder block water jacket, a second passageway for overboard exhaust of the water from the cylinder block, and thermostatic valve means normally communicating said first passageway with said second passageway for circulating water from the pump through the manifold casing and out for overboard discharge, an additional passageway interconnecting said valve means with the cylinder block water jacket, said valve means normally communicating said additional passageway with said second passageway for limiting flow of water from the water jacket to the second passageway.

6. In a marine engine cooling system embodying a water jacket, an exhaust manifold, water intake pump and oil cooler; a casing enclosing the manifold and having a forward end wall, means dividing the casing longitudinally in first and second water passageways, conduit means connected with the rear end of the first passageway and receiving water from the pump and oil cooler for discharge into the first passageway, means communicating the first passageway with the engine water jacket, said second passageway having a water discharge means, said forward end wall having a water outlet leading from the first passageway and a water inlet leading into the second passageway, a valve unit embodying a housing adapted to be secured against said forward end wall and having first, second and third openings in first, second and third chambers, said first and second openings being respectively in communication through the first and second chambers with said water outlet and said water inlet, a valve seat between said first and second openings separating said first and second chambers, conduit means for connecting said third opening through said third chamber with said engine water jacket, valve seat forming means between the second and third openings separating the second and third chambers, a heat responsive means supported in the third chamber, a valve stem carried by the heat responsive means for movement thereby in response to temperature changes in liquid in the third chamber, a valve head carried in the second chamber by said stem and normally engaging said seat forming means so the liquid flow normally is from the first chamber through the first opening to the second opening, said valve seat forming means having by-pass openings whereby a normally restricted flow is permitted from the third chamber to the second opening and then to the second passageway, and said valve head being arranged for co-action with the first valve seat to substantially shut off flow through the first opening to the second opening on predetermined movement of the head in one direction by the heat responsive means.

References Cited in the file of this patent

UNITED STATES PATENTS

| | | |
|---|---|---|
| 1,361,033 | Ericson | Dec. 7, 1920 |
| 2,387,793 | Holmes | Oct. 30, 1945 |
| 2,471,533 | Morgan | May 31, 1949 |
| 2,478,489 | Kelson | Aug. 9, 1949 |
| 2,602,592 | Tomoser | July 8, 1952 |